(12) United States Patent
Anderson

(10) Patent No.: US 8,813,203 B2
(45) Date of Patent: Aug. 19, 2014

(54) METHODS AND SYSTEMS FOR COMPLETING, BY A SINGLE-SIGN ON COMPONENT, AN AUTHENTICATION PROCESS IN A FEDERATED ENVIRONMENT TO A RESOURCE NOT SUPPORTING FEDERATION

(75) Inventor: Bradley Paul Anderson, Fort Lauderdale, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 13/602,899

(22) Filed: Sep. 4, 2012

(65) Prior Publication Data

US 2012/0331535 A1    Dec. 27, 2012

Related U.S. Application Data

(63) Continuation of application No. 11/875,552, filed on Oct. 19, 2007, now Pat. No. 8,281,378.

(60) Provisional application No. 60/862,296, filed on Oct. 20, 2006, provisional application No. 60/862,228, filed on Oct. 20, 2006.

(51) Int. Cl.
*H04L 29/06* (2006.01)
*H04L 9/32* (2006.01)

(52) U.S. Cl.
CPC .......... *H04L 63/0815* (2013.01); *H04L 9/3271* (2013.01); *H04L 9/3213* (2013.01)
USPC ................................................. 726/7; 726/8

(58) Field of Classification Search
CPC . H04L 63/0807; H04L 9/3213; H04L 63/062; H04L 9/0894; H04L 9/3171; H04L 9/3212; H04L 63/0815
See application file for complete search history.

(56) References Cited

U.S. PATENT DOCUMENTS

| 6,609,198 | B1 | 8/2003 | Wood et al. | |
|---|---|---|---|---|
| 7,249,375 | B2 | 7/2007 | Bhatia et al. | |
| 7,428,750 | B1 | 9/2008 | Dunn et al. | |
| 7,484,243 | B2 * | 1/2009 | Dankovich et al. | 726/8 |
| 7,562,382 | B2 * | 7/2009 | Hinton et al. | 726/2 |
| 7,631,346 | B2 * | 12/2009 | Hinton et al. | 726/8 |

(Continued)

OTHER PUBLICATIONS

Notice of Allowance on U.S. Appl. No. 11/875,552, dated Jun. 1, 2012.

(Continued)

*Primary Examiner* — Michael R Vaughan
(74) *Attorney, Agent, or Firm* — Foley and Lardner LLP; John D. Lanza

(57) ABSTRACT

A system for distributed authentication includes a client machine, in a first domain in a federation, that receives from a user a first set of authentication credentials. The system also includes an intermediate machine in a second domain in the federation, a server, also in the second domain, a password management program executing on the server and a non-federated resource. The intermediate machine authenticates the user responsive to receiving the first set of authentication credentials and identifies a second set of authentication credentials. The server in the second domain authenticates the user, responsive to the second set of authentication credentials. The password management program, executing on the server, retrieves a third set of authentication credentials associated with the user. The non-federated resource authenticates the user, responsive to receiving, from the password management program, the third set of authentication credentials.

11 Claims, 6 Drawing Sheets

(56) References Cited

U.S. PATENT DOCUMENTS

| | | |
|---|---|---|
| 7,640,574 B1 | 12/2009 | Kim et al. |
| 7,657,639 B2 * | 2/2010 | Hinton .......................... 709/229 |
| 7,676,829 B1 * | 3/2010 | Gui et al. ........................... 726/5 |
| 8,001,232 B1 * | 8/2011 | Saulpaugh et al. ........... 709/224 |
| 8,019,871 B2 * | 9/2011 | Milojicic ....................... 709/226 |
| 8,042,165 B2 * | 10/2011 | Innes et al. ....................... 726/10 |
| 2003/0140230 A1 * | 7/2003 | de Jong et al. ................. 713/182 |
| 2003/0188193 A1 * | 10/2003 | Venkataramappa .......... 713/201 |
| 2004/0128393 A1 | 7/2004 | Blakley et al. |
| 2004/0168090 A1 | 8/2004 | Chawla et al. |
| 2004/0210771 A1 * | 10/2004 | Wood et al. ................... 713/201 |
| 2005/0138362 A1 | 6/2005 | Kelly et al. |
| 2005/0188212 A1 | 8/2005 | Laferriere et al. |
| 2006/0048213 A1 | 3/2006 | Cheng et al. |
| 2006/0048216 A1 | 3/2006 | Hinton et al. |
| 2006/0075475 A1 * | 4/2006 | Boulos et al. ...................... 726/6 |
| 2007/0094392 A1 * | 4/2007 | Stone et al. .................... 709/225 |
| 2007/0174906 A1 | 7/2007 | Burchett et al. |

OTHER PUBLICATIONS

Office Action on U.S. Appl. No. 11/875,552, dated Oct. 18, 2010.
Office Action on U.S. Appl. No. 11/875,552, dated Apr. 26, 2011.

* cited by examiner

METHODS AND SYSTEMS FOR COMPLETING, BY A SINGLE-SIGN ON COMPONENT, AN AUTHENTICATION PROCESS IN A FEDERATED ENVIRONMENT TO A RESOURCE NOT SUPPORTING FEDERATION

RELATED APPLICATIONS

The present application is a continuation of U.S. patent application Ser. No. 11/875,552, entitled "Methods And Systems For Completing, By A Single-Sign On Component, An Authentication Process In A Federated Environment To A Resource Not Supporting Federation" filed Oct. 19, 2007, now allowed, which claims priority to U.S. Provisional Patent Application Ser. No. 60/862,296, entitled "Methods and Systems for Completing, by a Single Sign-On Component, an Authentication Process in a Federated Environment to a Resource Not Supporting Federation," filed Oct. 20, 2006, and to U.S. Provisional Patent Application Ser. No. 60/862,228, entitled "Enterprise Single Sign-On and Identity Federation in Thin-Client Computing Environments," filed Oct. 20, 2006, both of which are incorporated herein by reference.

FIELD OF THE INVENTION

The present disclosure relates to user authentication in secure computing environments. In particular, the present disclosure relates to methods and systems for authenticating a user trusted within a federated environment to use a non-federated resource.

BACKGROUND OF THE INVENTION

In a corporate computing environment, a plurality of computing entities across one or more domains may be grouped together in a federation. Typically, a federation defines a set of computing entities from one or more different domains that have a pre-established trust relationship with each other and within which a common set of authentication credentials, known as a federated identity, is valid. The federated identity allows a user to access various resources within the federation with a single sign-on. However, if the user requires to access a resource outside the federated environment, a separate set of authentication credentials is requested.

BRIEF SUMMARY OF THE INVENTION

In one aspect, a system for distributed authentication is shown and described. The system includes a client machine in a first domain in a federation that receives, from a user, a first set of authentication credentials. The system also includes an intermediate machine in a second domain in the federation; a server in the second domain; a password management program executing on the server; and a non-federated resource. The intermediate machine authenticates the user responsive to receiving the first set of authentication credentials and identifies a second set of authentication credentials. The server in the second domain authenticates the user responsive to the second set of authentication credentials. The password management program, executing on the server, retrieves a third set of authentication credentials, associated with the user, which authenticates the user to the non-federated resource.

In one embodiment, the intermediate machine may include a federated identity server in the second domain of the federation that authenticates the user responsive to receiving the first set of authentication credentials.

In another embodiment, the federation includes a set of entities that have a pre-established trust relationship with each other and within which a common set of authentication credentials is valid.

In some embodiments, one or more of the authentication credentials are selected from a group consisting of a user id-password pair, a smart card certificate, a smart card personal identification number (PIN), a Kerberos authentication credential, a biometric authentication mechanism and data protection mechanisms such as Data Protection Application Programming Interface (DPAPI). In further embodiments, the biometric authentication mechanism may be selected from a group consisting of fingerprint identification, iris identification, face recognition, retinal scan, voice recognition, facial thermograph, handwriting recognition, keystroke recognition, DNA identification and a combination of one or more of these mechanisms.

In another aspect, a method of facilitating distributed authentication includes receiving a first set of authentication credentials from a user by a client machine in a first domain in a federation, authenticating the user by an intermediate machine in a second domain responsive to receiving the first set of authentication credentials, authenticating the user by a server in the second domain responsive to receiving a second set of authentication credentials identified by the intermediate machine. The method includes retrieving a third set of authentication credentials associated with the user by a password management program executing on the server and authenticating the user by a non-federated resource responsive to receiving the third set of authentication credentials from the password management program.

In another embodiment, the method includes authenticating the user by a federated identity server in the second domain, responsive to receiving the first set of authentication credentials.

In a further embodiment, the method includes retrieving the second set of authentication credentials, by the server in the second domain, from a second server identified by the intermediate machine. In yet another embodiment, the method includes retrieving the second set of authentication credentials, by the server in the second domain, from a second server identified by a second intermediate machine in communication with the intermediate machine.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION OF THE INVENTION

Figure 1A:
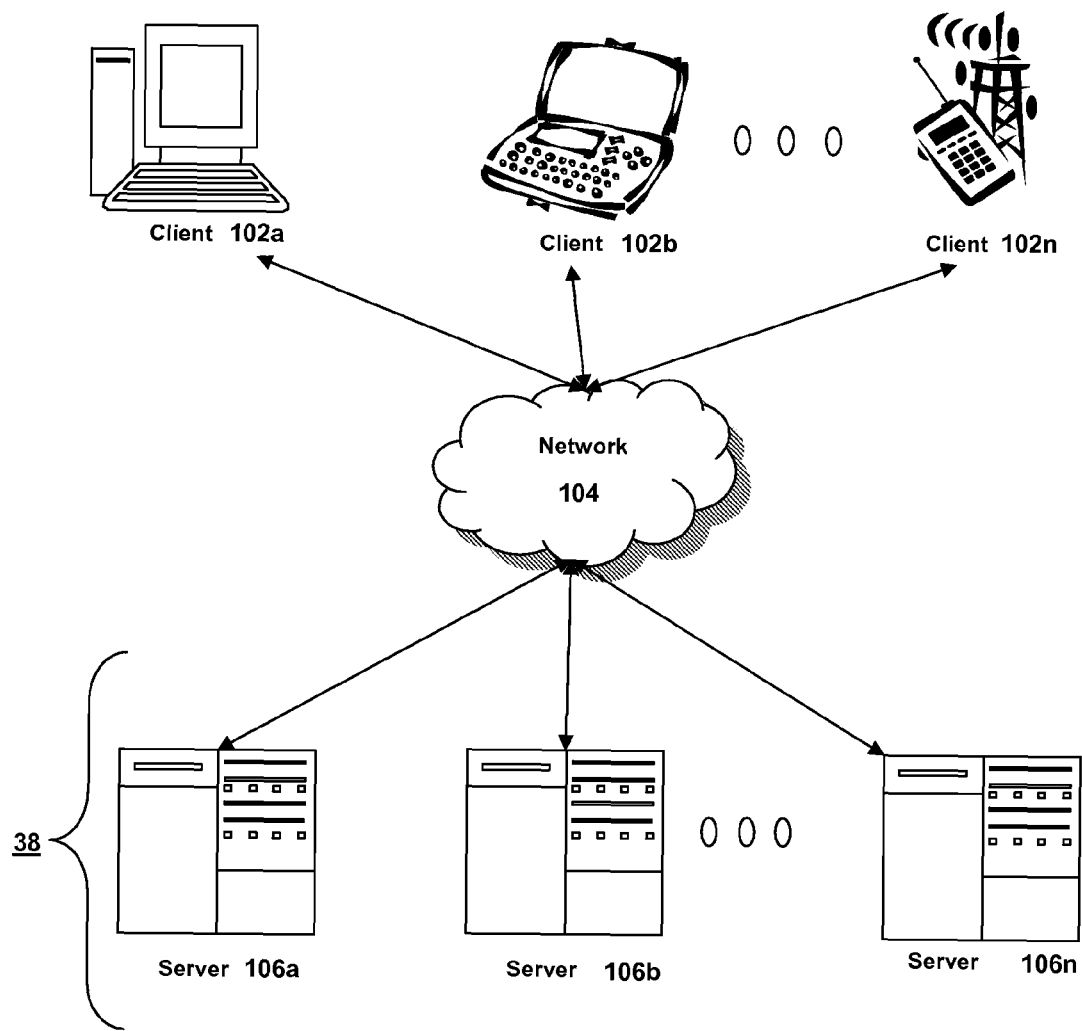
FIG. 1A is a block diagram depicting an embodiment of a network environment comprising client machines in communication with remote machines.

Referring now to FIG. 1A, an embodiment of a network environment is depicted. In brief overview, the network environment comprises one or more clients 102a-102n (also generally referred to as local machine(s) 102, client(s) 102, client node(s) 102, client computer(s) 102, client device(s) 102, or endpoint(s) 102) in communication with one or more servers 106a-106n (also generally referred to as server(s) 106, or remote machine(s) 106) via one or more networks 104.

Although FIG. 1A shows a network 104 between the clients 102 and the servers 106, the clients 102 and the servers 106 may be on the same network 104. The network 104 can be a local-area network (LAN), such as a company Intranet, a metropolitan area network (MAN), or a wide area network (WAN), such as the Internet or the World Wide Web. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another embodiment, networks 104 and 104' may both be private networks.

The network 104 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 may be a bus, star, or ring network topology. The network 104 and network topology may be of any such network or network topology as known to those ordinarily skilled in the art capable of supporting the operations described herein. The network may comprise mobile telephone networks utilizing any protocol or protocols used to communicate among mobile devices, including AMPS, TDMA, CDMA, GSM, GPRS or UMTS. In some embodiments, different types of data may be transmitted via different protocols. In other embodiments, the same types of data may be transmitted via different protocols.

In one embodiment, the system may include multiple, logically-grouped servers 106. In these embodiments, the logical group of servers may be referred to as a server farm 38. In some of these embodiments, the servers 106 may be geographically dispersed. In some cases, a farm 38 may be administered as a single entity. In other embodiments, the server farm 38 comprises a plurality of server farms 38. In one embodiment, the server farm executes one or more applications on behalf of one or more clients 102.

The servers 106 within each farm 38 can be heterogeneous. One or more of the servers 106 can operate according to one type of operating system platform (e.g., WINDOWS NT, manufactured by Microsoft Corp. of Redmond, Wash.), while one or more of the other servers 106 can operate on according to another type of operating system platform (e.g., Unix or Linux). In some embodiments, a server 106 executes an application on behalf of a user or a client 102. In other embodiments, a server 106 executes a virtual machine, which provides an execution session within which applications execute on behalf of a user or a client 102. In one of these embodiments, the execution session is a hosted desktop session. In another of these embodiments, the execution session provides access to a computing environment, which may comprise one or more of: an application, a plurality of applications, a desktop application, and a desktop session in which one or more applications may execute.

The servers 106 of each farm 38 do not need to be physically proximate to another server 106 in the same farm 38. Thus, the group of servers 106 logically grouped as a farm 38 may be interconnected using a wide-area network (WAN) connection or a metropolitan-area network (MAN) connection. For example, a farm 38 may include servers 106 physically located in different continents or different regions of a continent, country, state, city, campus, or room. Data transmission speeds between servers 106 in the farm 38 can be increased if the servers 106 are connected using a local-area network (LAN) connection or some form of direct connection.

Server 106 may be a file server, application server, web server, proxy server, appliance, network appliance, gateway, application gateway, gateway server, virtualization server, deployment server, SSL VPN server, or firewall. In some embodiments, a server 106 provides a remote authentication dial-in user service, and is referred to as a RADIUS server. In other embodiments, a server 106 may have the capacity to function as either an application server or as a master application server. In still other embodiments, a server 106 is a blade server. In yet other embodiments, a server 106 executes a virtual machine providing, to a user or client computer 102, access to a computing environment.

In one embodiment, a server 106 may include an Active Directory. The server 106 may be an application acceleration appliance. For embodiments in which the server 106 is an application acceleration appliance, the server 106 may provide functionality including firewall functionality, application firewall functionality, or load balancing functionality. In some embodiments, the server 106 comprises an appliance such as one of the line of appliances manufactured by the Citrix Application Networking Group, of San Jose, Calif., or Silver Peak Systems, Inc., of Mountain View, Calif., or of Riverbed Technology, Inc., of San Francisco, Calif., or of F5 Networks, Inc., of Seattle, Wash., or of Juniper Networks, Inc., of Sunnyvale, Calif.

The clients 102 may also be referred to as client nodes, client machines, endpoint nodes, or endpoints. In some embodiments, a client 102 has the capacity to function as both a client node seeking access to resources provided by a server and as a server providing access to hosted resources for other clients 102a-102n.

In some embodiments, a client 102 communicates with a server 106. In one embodiment, the client 102 communicates directly with one of the servers 106 in a farm 38. In another embodiment, the client 102 executes a program neighborhood application to communicate with a server 106 in a farm 38. In still another embodiment, the server 106 provides the functionality of a master node. In some embodiments, the client 102 communicates with the server 106 in the farm 38 through a network 104. Over the network 104, the client 102 can, for example, request execution of various applications hosted by the servers 106a-106n in the farm 38 and receive output data of the results of the application execution for display. In some embodiments, only the master node provides the functionality required to identify and provide address information associated with a server 106b hosting a requested application.

In one embodiment, the server 106 provides the functionality of a web server. In another embodiment, the server 106a receives requests from the client 102, forwards the requests to a second server 106b and responds to the request by the client 102 with a response to the request from the server 106b. In still another embodiment, the server 106 acquires an enumeration of applications available to the client 102 and address information associated with a server 106 hosting an application identified by the enumeration of applications. In yet another embodiment, the server 106 presents the response to the request to the client 102 using a web interface. In one embodiment, the client 102 communicates directly with the server 106 to access the identified application. In another embodiment, the client 102 receives output data, such as display data, generated by an execution of the identified application on the server 106.

In some embodiments, the server 106 or a server farm 38 may be running one or more applications, such as an application providing a thin-client computing or remote display presentation application. In one embodiment, the server 106 or server farm 38 executes as an application any portion of the CITRIX ACCESS SUITE by Citrix Systems, Inc., such as the MetaFrame or CITRIX PRESENTATION SERVER, and/or any of the MICROSOFT WINDOWS Terminal Services manufactured by the Microsoft Corporation. In another embodiment, the application is an ICA client, developed by Citrix Systems, Inc. of Fort Lauderdale, Fla. In still another embodiment, the server 106 may run an application, which, for example, may be an application server providing email services such as MICROSOFT EXCHANGE manufactured by the Microsoft Corporation of Redmond, Wash., a web or Internet server, or a desktop sharing server, or a collaboration server. In yet another embodiment, any of the applications may comprise any type of hosted service or products, such as GOTOMEETING provided by Citrix Online Division, Inc. of Santa Barbara, Calif., WEBEX provided by WebEx, Inc. of Santa Clara, Calif., or Microsoft Office LIVE MEETING provided by Microsoft Corporation of Redmond, Wash.

A client 102 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on client 102. In some embodiments, the application may be a server-based or a remote-based application executed on behalf of the client 102 on a server 106. In one embodiments the server 106 may display output data to the client 102 using any thin-client or remote-display protocol, such as the Independent Computing Architecture (ICA) protocol manufactured by Citrix Systems, Inc. of Ft. Lauderdale, Fla. or the Remote Desktop Protocol (RDP) manufactured by the Microsoft Corporation of Redmond, Wash. The application can use any type of protocol and it can be, for example, an HTTP client, an FTP client, an Oscar client, or a Telnet client. In other embodiments, the application comprises any type of software related to voice over internet protocol (VoIP) communications, such as a soft IP telephone. In further embodiments, the application comprises any application related to real-time data communications, such as applications for streaming video and/or audio.

Figure 1B:
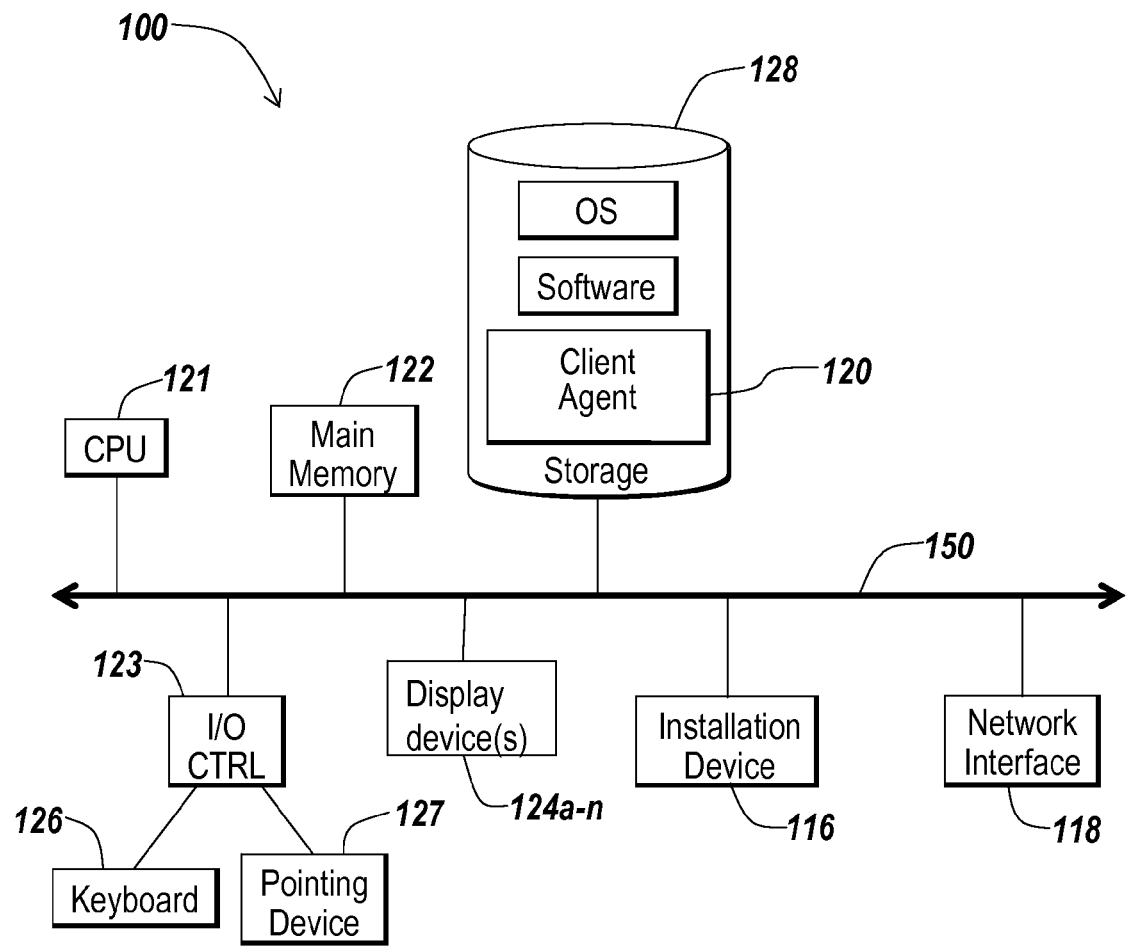
FIGS. 1B and 1C are block diagrams depicting embodiments of computers useful in connection with the methods and systems described herein.
Figure 1C:
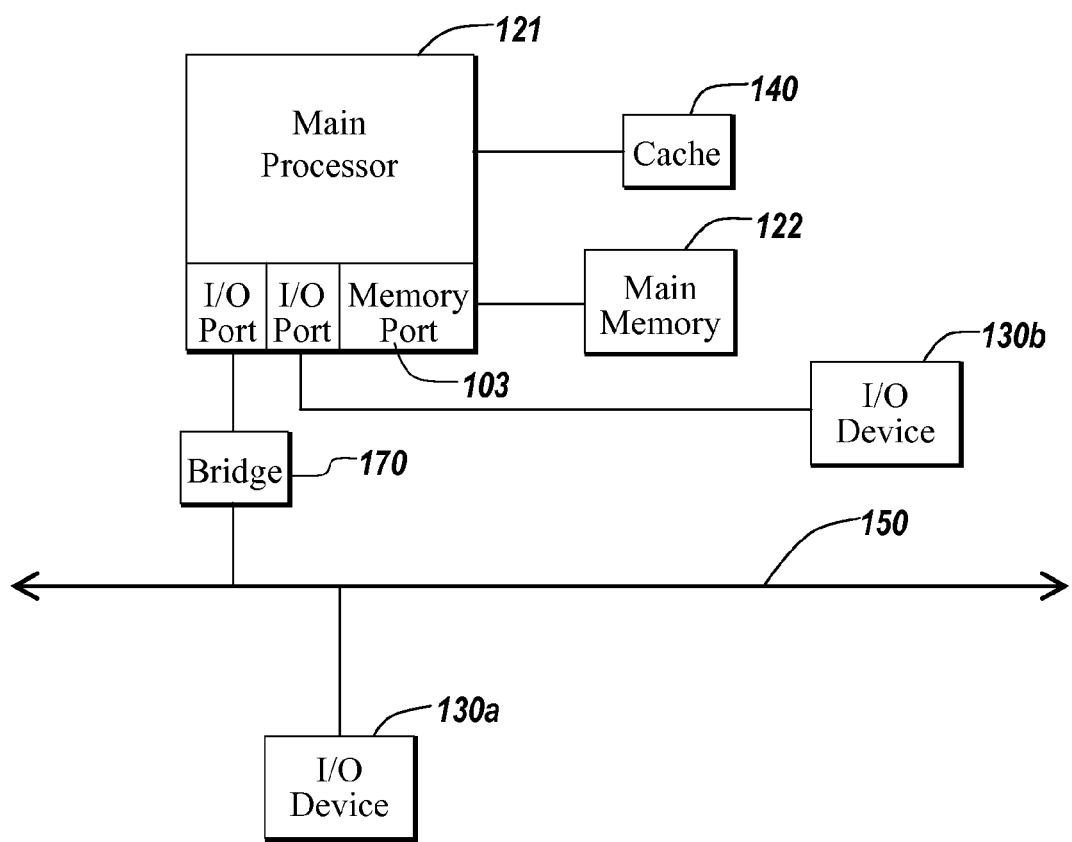

The client 102 and server 106 may be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the client 102 or a server 106. As shown in FIGS. 1B and 1C, each computing device 100 includes a central processing unit 121, and a main memory unit 122. As shown in FIG. 1B, a computing device 100 may include a visual display device 124, a keyboard 126 and/or a pointing device 127, such as a mouse. As shown in FIG. 1C, each computing device 100 may also include additional optional elements, such as one or more input/output devices 130a-130b (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 121, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC 100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 may be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1C, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with the display 124. FIG. 1C depicts an embodiment of a computer 100 in which the main processor 121 communicates directly with I/O device 130b via HyperTransport, Rapid I/O, or InfiniBand. FIG. 1C also depicts an embodiment in which local busses and direct communication are mixed: the processor 121 communicates with I/O device 130*a* using a local interconnect bus while communicating with I/O device 130*b* directly.

The computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any client agent 120, or portion thereof. The computing device 100 may further comprise a storage device, such as one or more hard disk drives or redundant arrays of independent disks, for storing an operating system and other related software, and for storing application software programs such as any program related to the client agent 120. Optionally, any of the installation devices 116 could also be used as the storage device. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

A wide variety of I/O devices 130*a*-130*n* may be present in the computing device 100. Input devices include keyboards, mice, trackpads, trackballs, microphones, and drawing tablets. Output devices include video displays, speakers, inkjet printers, laser printers, and dye-sublimation printers. The I/O devices may be controlled by an I/O controller 123 as shown in FIG. 1B. The I/O controller may control one or more I/O devices such as a keyboard 126 and a pointing device 127, e.g., a mouse or optical pen. Furthermore, an I/O device may also provide storage and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif.

In some embodiments, the computing device 100 may comprise or be connected to multiple display devices 124*a*-124*n*, which each may be of the same or different type and/or form. As such, any of the I/O devices 130*a*-130*n* and/or the I/O controller 123 may comprise any type and/or form of suitable hardware, software, or combination of hardware and software to support, enable or provide for the connection and use of multiple display devices 124*a*-124*n* by the computing device 100. For example, the computing device 100 may include any type and/or form of video adapter, video card, driver, and/or library to interface, communicate, connect or otherwise use the display devices 124*a*-124*n*. In one embodiment, a video adapter may comprise multiple connectors to interface to multiple display devices 124*a*-124*n*. In other embodiments, the computing device 100 may include multiple video adapters, with each video adapter connected to one or more of the display devices 124*a*-124*n*. In some embodiments, any portion of the operating system of the computing device 100 may be configured for using multiple displays 124*a*-124*n*. In other embodiments, one or more of the display devices 124*a*-124*n* may be provided by one or more other computing devices, such as computing devices 100*a* and 100*b* connected to the computing device 100, for example, via a network. These embodiments may include any type of software designed and constructed to use another computer's display device as a second display device 124*a* for the computing device 100. One ordinarily skilled in the art will recognize and appreciate the various ways and embodiments that a computing device 100 may be configured to have multiple display devices 124*a*-124*n*.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a Fibre-Channel bus, or a Serial Attached small computer system interface bus.

A computing device 100 of the sort depicted in FIGS. 1B and 1C typically operates under the control of operating systems, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, WINDOWS XP, and WINDOWS VISTA, all of which are manufactured by Microsoft Corporation of Redmond, Wash.; MACOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

The computer system 100 can be any workstation, desktop computer, laptop or notebook computer, server, handheld computer, mobile telephone or other portable telecommunication device, media playing device, a gaming system, mobile computing device, or any other type and/or form of computing, telecommunications or media device that is capable of communication and that has sufficient processor power and memory capacity to perform the operations described herein. For example, the computer system 100 may comprise a device of the IPOD family of devices manufactured by Apple Computer of Cupertino, Calif., a PLAYSTATION 2, PLAYSTATION 3, or PERSONAL PLAYSTATION PORTABLE (PSP) device manufactured by the Sony Corporation of Tokyo, Japan, a NINTENDO DS, NINTENDO GAMEBOY, NINTENDO GAMEBOY ADVANCED or NINTENDO REVOLUTION device manufactured by Nintendo Co., Ltd., of Kyoto, Japan, or an XBOX or XBOX 360™ device manufactured by the Microsoft Corporation of Redmond, Wash.

In some embodiments, the computing device 100 may have different processors, operating systems, and input devices consistent with the device. For example, in one embodiment, the computing device 100 is a TREO 180, 270, 600, 650, 680, 700p, 700w, or 750 smart phone manufactured by Palm, Inc. In some of these embodiments, the TREO smart phone is operated under the control of the PalmOS operating system and includes a stylus input device as well as a five-way navigator device.

In other embodiments the computing device 100 is a mobile device, such as a JAVA-enabled cellular telephone or personal digital assistant (PDA), such as the i55sr, i58sr, i85s, i88s, i90c, i95cl, or the im1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea.

In still other embodiments, the computing device 100 is a Blackberry handheld or smart phone, such as the devices manufactured by Research In Motion Limited, including the Blackberry 7100 series, 8700 series, 7700 series, 7200 series, the Blackberry 7520, or the Blackberry Pearl 8100. In yet other embodiments, the computing device 100 is a smart phone, Pocket PC, Pocket PC Phone, or other handheld mobile device supporting Microsoft Windows Mobile Software. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 100 is a digital audio player. In one of these embodiments, the computing device 100 is a digital audio player such as the Apple IPOD, IPOD Touch, IPOD NANO, and IPOD SHUFFLE lines of devices, manufactured by Apple Computer of Cupertino, Calif. In another of these embodiments, the digital audio player may function as both a portable media player and as a mass storage device. In other embodiments, the computing device 100 is a digital audio player such as the DigitalAudioPlayer Select MP3 players, manufactured by Samsung Electronics America, of Ridgefield Park, N.J., or the Motorola m500 or m25 Digital Audio Players, manufactured by Motorola Inc. of Schaumburg, Ill. In still other embodiments, the computing device 100 is a portable media player, such as the Zen Vision W, the Zen Vision series, the Zen Portable Media Center devices, or the Digital MP3 line of MP3 players, manufactured by Creative Technologies Ltd. In yet other embodiments, the computing device 100 is a portable media player or digital audio player supporting file formats including, but not limited to, MP3, WAV, M4A/AAC, WMA Protected AAC, RIFF, Audible audiobook, Apple Lossless audio file formats and .mov, .m4v, and .mp4 MPEG-4 (H.264/MPEG-4 AVC) video file formats.

In some embodiments, the computing device 100 comprises a combination of devices, such as a mobile phone combined with a digital audio player or portable media player. In one of these embodiments, the computing device 100 is a Motorola RAZR or Motorola ROKR line of combination digital audio players and mobile phones. In another of these embodiments, the computing device 100 is an iPhone smartphone, manufactured by Apple Computer of Cupertino, Calif.

In one embodiment, the server 106 includes a policy engine (not shown) for controlling and managing the access to a resource, selection of an execution method for accessing the resource, and the delivery of resources. In another embodiment, the server 106 communicates with a policy engine. In some embodiments, the policy engine determines the one or more resources a user or client 102 may access. In other embodiments, the policy engine determines how the resource should be delivered to the user or client 102, e.g., the method of execution. In still other embodiments, the server 106 provides a plurality of delivery techniques from which to select a method of execution, such as a server-based computing, application streaming, or delivering the application locally to the client 102 for local execution.

In one embodiment, a client 102 requests execution of an application program and a server 106 selects a method of executing the application program. In another embodiment, the server 106 receives credentials from the client 102. In still another embodiment, the server 106 receives a request for an enumeration of available applications from the client 102. In yet another embodiment, in response to the request or receipt of credentials, the server 106 enumerates a plurality of application programs available to the client 102.

Figure 2A:
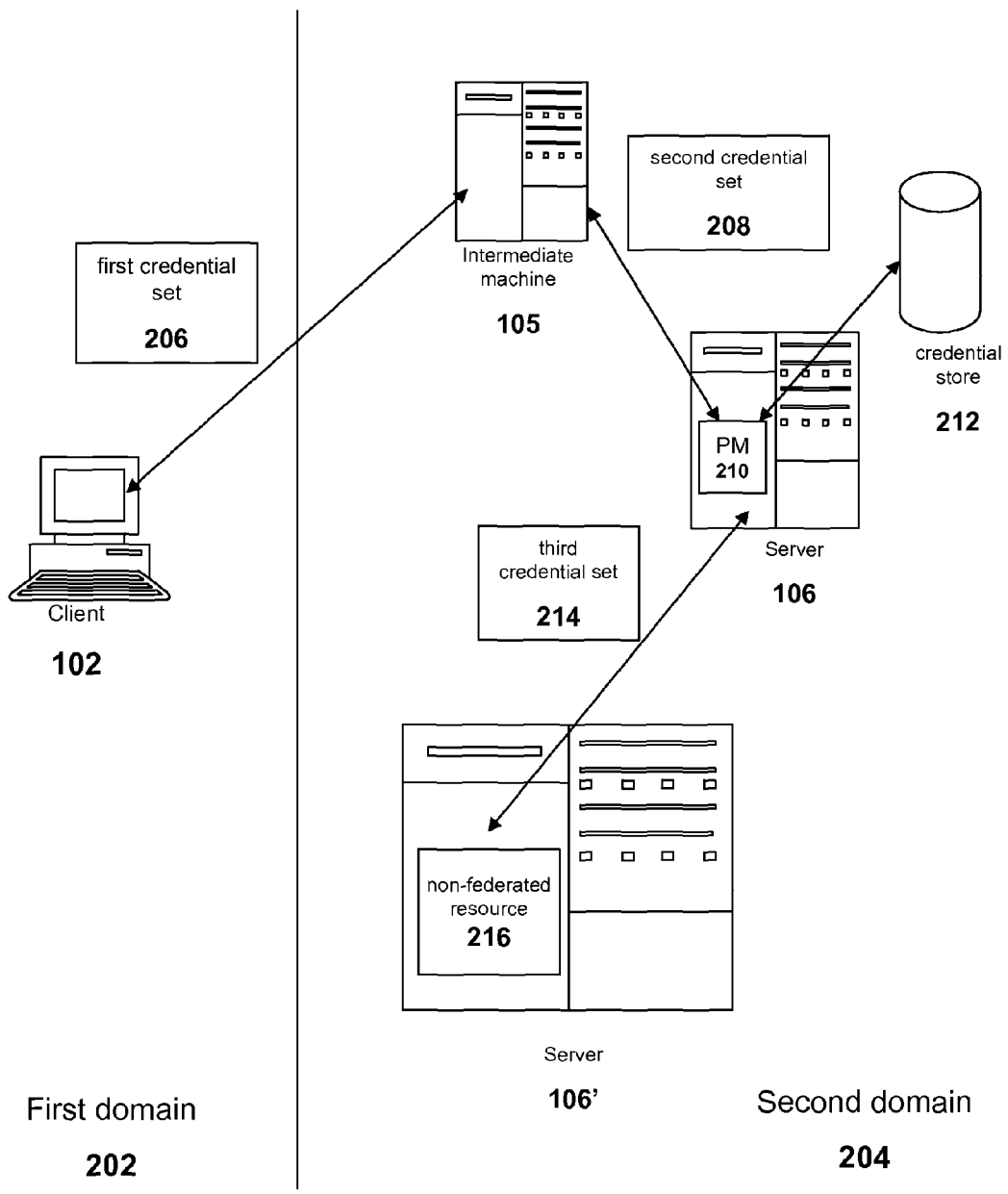
FIGS. 2A and 2B are block diagrams depicting embodiments of a system where a client in a first domain of a federated environment is authenticated to a non-federated resource through multiple entities in a second domain of the federated environment.

Referring now to FIG. 2A, an overview of a system 200 for completing, by a single sign on component, an authentication process in a federated environment 201 to a non-federated resource 216, is depicted. The system 200 includes a client 102, in a first domain 202 of a federated environment 201, requesting access to a non-federated resource 216. The system also includes, in a second domain 204 of the federated environment 201, an intermediate machine 105, a server 106, a password manager program 210 executing on the server 106 and a credential store 212. The client 102 communicates with the intermediate machine 105 through a network 104 as described in connection with FIG. 1A. A first set of authentication credentials 206 is sent from the client to the intermediate machine 105 over the network 104. The intermediate machine 105 communicates with the server 106 to send a second set of authentication credentials 208 associated with the user. The password manager program 210 executing on the server 106 communicates with the non-federated resource 216 executing on the server 106'. A third set of authentication credentials 214 is transmitted from the password manager program 210 to the non-federated resource 216. In some embodiments, the password manager program 210 retrieves the third set of authentication credentials 214 from a credential store 212.

In one embodiment, the first domain 201 includes a client machine 102 from which a user requests access to a non-federated resource 216 residing in the second domain 204. In one embodiment, the client machine 102 is a machine 102 as described above in connection with FIGS. 1A-1C. In another embodiment, the client machine 102 includes a transmitter that sends the first set of authentication credentials 206 to the intermediate machine 106. In still another embodiment, the client machine 102 includes a receiver, which receives authentication credentials from the user. In yet another embodiment, the client machine 102 displays a Graphical Identification and Authentication (GINA) interface to accept authentication credentials from the user.

In some embodiments, the client machine 102 transmits the user credentials to a second intermediate machine 105' residing in the first domain 201 (not shown). In one of these embodiments, the second intermediate machine 105' authenticates the user to the first domain 201, responsive to the received user credentials. In another embodiment, the second intermediate machine 105' generates authentication information associated with the user, responsive to the received user credentials; for example, the second intermediate machine 105' may generate an Active Directory Federated Services (ADFS) assertion associated with the user or a Security Assertion Markup Language (SAML) assertion, responsive to the received user credentials. In still another embodiment, the second intermediate machine 105' transmits the generated authentication information to the intermediate machine 105 in the second domain 204. In yet another embodiment, the second intermediate machine 105' transmits the received user credentials to the intermediate machine 105.

In one embodiment, the second domain 204 includes an intermediate machine 105, a server 106, a password manager program 210 that executes on the server 106, and a credential store 212 that is accessed by the password manager program 210. In one embodiment, the intermediate machine 105 is a federated identity server controlling access to the resources in the federation 201. In another embodiment, the intermediate machine 105 is connected to a server 106. In still another embodiment, the server 106 is a Citrix Presentation Server (CPS) on which the password management program 210 executes. In still even another embodiment, the server 106 is in communication with a second intermediate machine 105' which is in communication with the intermediate machine 105, as described in greater detail below in connection with FIG. 2B. In yet another embodiment, the intermediate machine 105 transmits a second set of authentication credentials 208 associated with the user to the server 106.

In some embodiments the first set of authentication credentials 206 are different from the second set of authentication credentials 208. In one of these embodiments, the first set of authentication credentials is an ADFS claim whereas the second set of authentication credentials 208 is a Kerberos ticket. In other embodiments, the second set of authentication credentials 208 is generated responsive to the first set of authentication credentials 206.

In some embodiments, the non-federated resource 216 to which the user requests access, executes on a server 106' in the second domain 204 of the federation 201. In one of these embodiments, the server 106' is a part of the federation 201. In another embodiment, the server 106' is outside the federation 201. In other embodiments, the non-federated resource 216 is an application program. In still other embodiments, the non-federated resource 216 is a file. In still even other embodiments, the non-federated resource 216 is a computing environment, such as a desktop environment, providing access to one or more application programs. In yet other embodiments, the non-federated resource 216 requires the third set of authentication credentials 214, provided by the password manager 210, to authenticate the user.

Figure 2B:
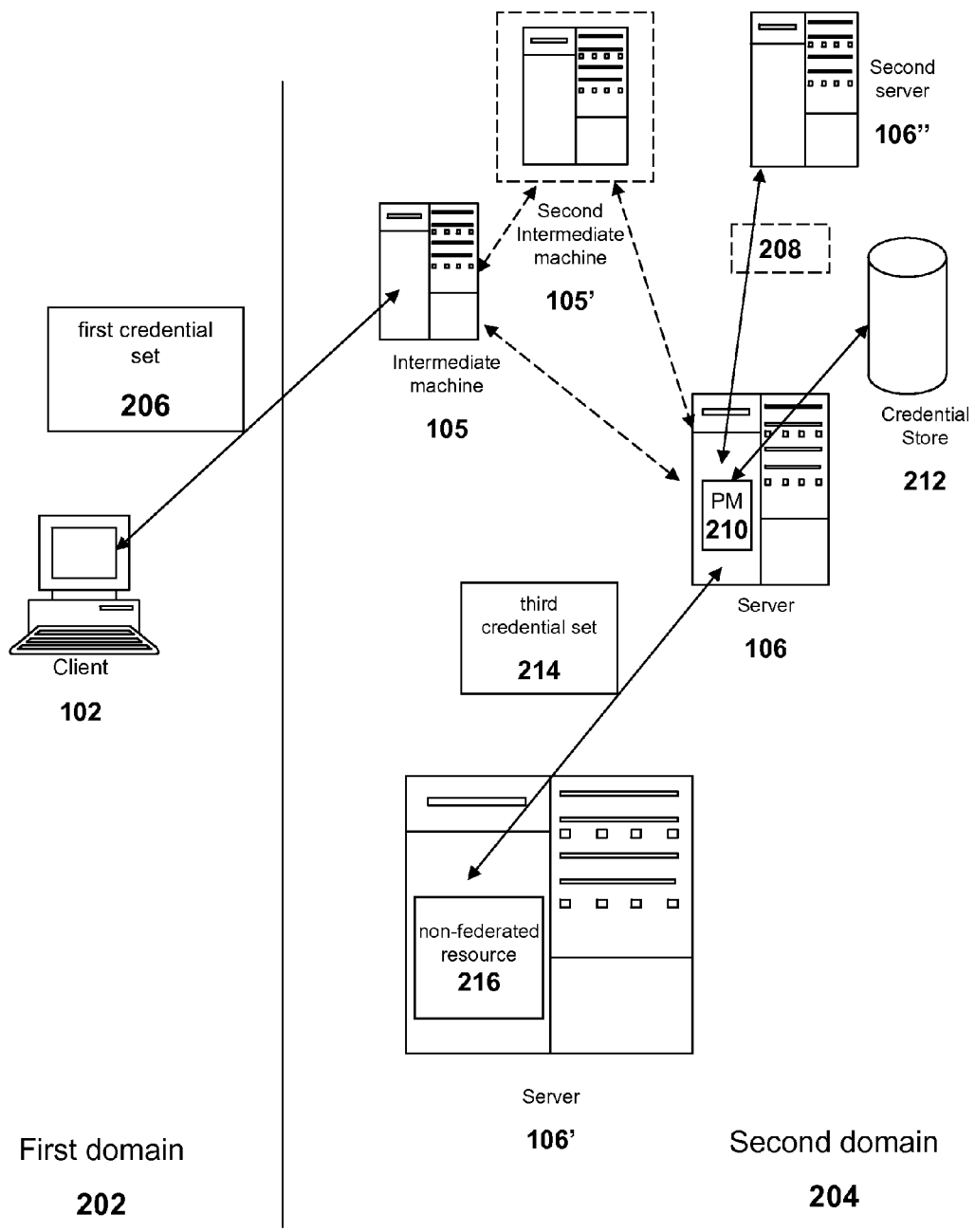

Referring now to FIG. 2B, and in one embodiment, the server 106 communicates with a second server 106" to retrieve the second set of authentication credentials 208. In another embodiment, the intermediate machine 105 is an access gateway in communication with a second intermediate machine 105' as depicted, in shadow, in FIG. 2B. In this embodiment, the second intermediate machine 105' is a federated identity server. In still another embodiment, a second intermediate machine 105' is a web interface server in communication with the server 106. In still another embodiment, the second intermediate machine 105' transmits the second set of authentication credentials 208 associated with the user to the server 106.

In one embodiment, the server 106 communicates with the intermediate machine 105 to retrieve the second set of authentication credentials 208 from the second server 106". In another embodiment, the server 106 communicates with the second intermediate machine 105' to retrieve the second set of authentication credentials 208 from the second server 106".

Referring back to FIG. 2A, in one embodiment, the password manager program 210 communicates with the credential store 212 to retrieve the third set of authentication credentials 214 required to access the non-federated resource 216. In some embodiments, the credential store 212 is a centralized database. In one of these embodiments, the credential store 212 resides on the server 106. In another of these embodiments, the credential store 212 does not reside on the server 106.

In some embodiments, the password manager program 210 securely manages authentication information associated with a user. In one of these embodiments, the password manager 210 uses the authentication information to authenticate the user to perform a plurality of functions. In one embodiment, the function is a login. In another embodiment, the function is a password change. In another of these embodiments, the password manager program 210 includes server-based features that also allow users to manage their primary credential and encryption keys and perform password resets or account unlock. In still another of these embodiments, the password manager program 210 allows administrators to configure the password manager 210 for use with many web, windows, and mainframe applications without scripting and without modifying the applications themselves.

In some embodiments, a user has both primary and secondary credentials used to authenticate or authorize the user to accounts, including accounts on servers, workstations, client devices or machines, application programs, web-based application programs, and internet sites. In one of these embodiments, a primary credential refers to a credential that the user provides to login into a primary point-of-access, such as their workstation, an internet portal or a server, such as an application server. In another of these embodiments, a secondary credential refers to any credential information that is managed by a password manager program 210, such as a user's credentials for a website, or a Windows application.

In some embodiments, a first cryptographic key is protected by the primary authentication methods and key recovery methods. In one of these embodiments, the password manager program 210 performs a key recovery process to acquire this key. In another of these embodiments, the password manager program 210 accesses the first cryptographic key through a mechanism other than the current primary authentication method. In other embodiments, a second cryptographic key is used to protect the users' secondary credentials. In one of these embodiments, the second cryptographic key is protected by the first cryptographic key.

In some embodiments, the password manager program 210 provides a management interface. In one of these embodiments, the management interface allows an administrator to create application definitions, password policies, and other configuration data. In another of these embodiments, the management interface stores received settings in a centralized storage location.

In some embodiments, the password manager program 210 comprises an agent. In one of these embodiments, the agent retrieves administrator-defined settings and user-specific application credentials (secondary credentials) from a centralized storage location 212. In another of these embodiments, the agent uses a user's primary credentials to generate cryptographic keys which encrypt/decrypt the secondary credentials. In still another of these embodiments, the agent performs the encryption/decryption of the user's credentials. In yet another of these embodiments, the agent verifies the integrity of configuration information retrieved from a centralized storage location 212 via digital signatures, such as a signature generated by a data integrity service.

In one embodiment, the password manager 210 includes an agent using the credentials and the configuration data retrieved from the centralized storage location 212 to act on behalf of the user to perform logon and password change functions for windows, web, and terminal-emulator-based applications.

In some embodiments, the password manager program 210 uses a primary credential to decrypt a secondary credential stored in the centralized storage location 212. In some embodiments, the authorization credentials include a number of types of authentication information, including without limitation, user names, client names, client addresses, passwords, Personal Identification Numbers (PINs), one-time passcodes, biometric data, digital certificates, tickets, etc. and combinations thereof. In other embodiments, the biometric data is taken from a physiological characteristic of the user including, but not limited to, face, fingerprint, iris, hand and DNA. In still other embodiments, the biometric data is taken from a behavioral characteristic of the user including, but not limited to, keystroke pattern, handwriting and voice.

In other embodiments the password manager program 210 requires a Kerberos ticket to retrieve and decrypt the secondary credentials. In another of these embodiments, the agent uses a single key recovery mechanism and allows different authentication mechanisms to be used. In still another of these embodiments, separation of authentication and key recovery mechanisms provides user flexibility in choices of authentication mechanisms and allows agents to function in different operating environments.

In some embodiments, agent behavior is altered to allow multiple, primary authentication methods to be concurrently configured. In one of these embodiments, a key recovery process occurs the first time a new primary authentication method is observed. However, existing protected copies of the first cryptographic key will not be deleted when a new one is added. By retaining the multiple copies, the key recovery process can be avoided when the system switches back to the previously-used primary authentication method.

In one embodiment, the password manager program 210 generates an encryption key to encrypt the secondary credentials of a user. In another embodiment, the password manager program 210 stores the encryption key in a user profile associated with the user's primary point-of-access. In still another embodiment, the password manager program 210 accesses the user's profile and retrieves the encryption key. In yet another embodiment, the password manager program 210 decrypts the secondary credentials using the retrieved encryption key.

In some embodiments, the password manager program 210 comprises a single sign-on component, which completes an authentication process for a user to a resource, such as an application. In one of these embodiments, the resource does not support federated identity services and is called a non-federated resource 216. In one embodiment, the password manager program 210 can retrieve, from a centralized credential store 212, the third set of authentication credentials 214 required to authenticate the user to the non-federated resource 216.

In some of these embodiments, the Kerberos ticket is provided to the password manager program 210 as a primary authentication credential. In one of these embodiments, the password manager program 210 uses the Kerberos ticket to access a first cryptographic key protecting a second cryptographic key required to access the user's secondary credentials. In another of these embodiments, the password manager program 210 provides the secondary credentials to a requested application or account in the second domain, authenticating the user in the first domain.

In some embodiments, the user in the first domain provides primary authentication credentials, over a network 104, to a federation service provided by a federated identity server. In one of these embodiments, the federation service is provided by a federated identity server such as one of the type manufactured by Ping Identity of Denver, Colo. In another of these embodiments, the federation service is provided by software executing on a server, such as the TIVOLI line of Federated Identity Manager software products manufactured by IBM Corporation of White Plains, N.Y. In other embodiments, the federation service forwards the primary authentication credentials to the intermediate machine 105. In one of these embodiments, the federation service provides the intermediate machine with authentication data associated with the authentication credentials. In still other embodiments, the intermediate machine 105 impersonates the client machine 102 and requests access to the second domain 204 from a domain controller residing in the second domain 204. In yet other embodiments, the domain controller authorizes the user to the second domain 204, responsive to a determination that the impersonated client machine is trusted for delegation. In a further embodiment, the domain controller transmits to a server 106, such as an application server residing in the second domain 204, authentication data associated with the user. In one of these embodiments, authentication to the server enables the password manager program 210 to access authentication data associated with the user. In another of these embodiments, the password manager program 210 authenticates the user to a non-federated resource 216, such as an application, which does not accept either the primary authentication credentials, or the authentication data generated in the federated environment. In some embodiments, the resource is a virtualized resource, such as a virtualized desktop or a computing environment provided by a virtual machine executing on a server 106'.

Figure 3:
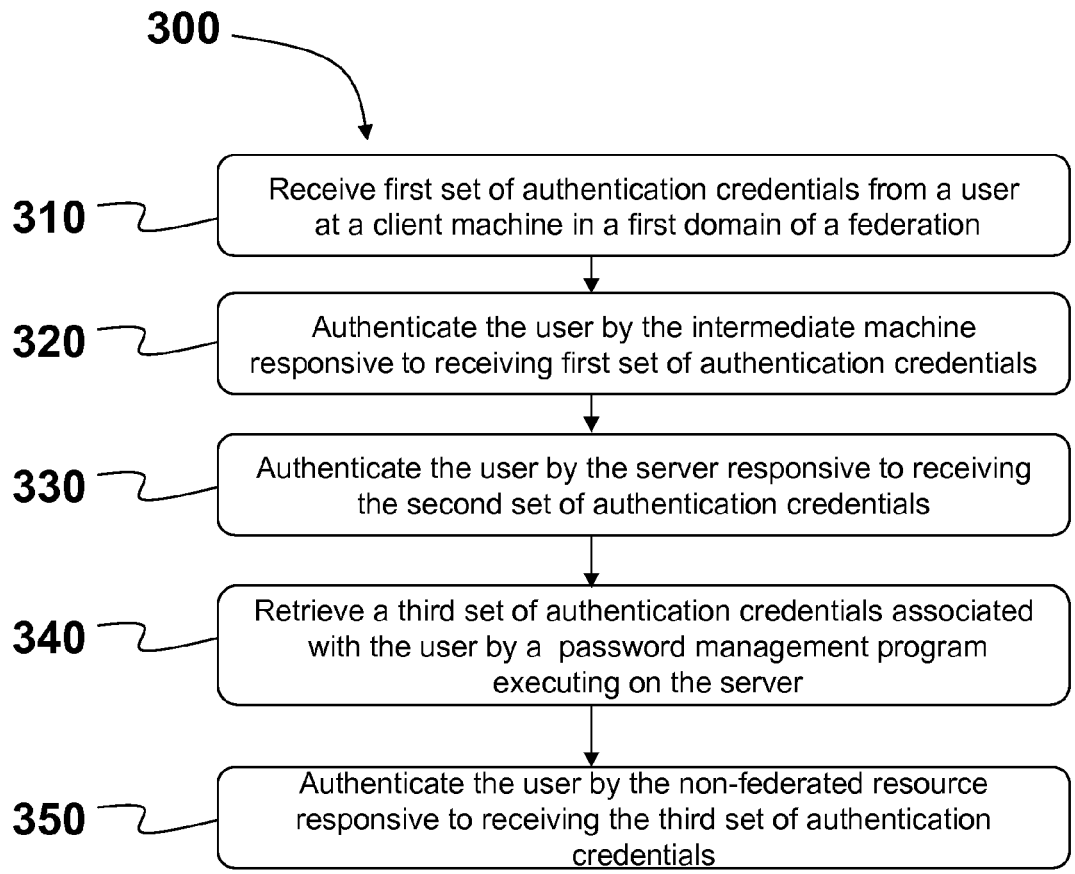
FIG. 3 is a flow diagram depicting one embodiment of the steps taken in a method for completing by a single sign on component, an authentication process in a federated environment to a resource not supporting federation.

Referring now to FIG. 3, a flow diagram depicts one embodiment of a method 300 for authenticating a client 102, in a first domain 202 of a federated environment 201, to a non-federated resource 216. In brief overview, the client 102, in the first domain 202 of a federated environment 201, receives (step 310) a first set of authentication credentials 206 from a user. The intermediate machine 105 authenticates (step 320) the user responsive to receiving the first set of authentication credentials 206. The server 106 authenticates (step 330) the user, responsive to a second set of authentication credentials 208. A third set of authentication credentials 214, associated with the user, is retrieved (step 340) by a password manager program 210 executing on the server 106. The user is authenticated (step 350) by the non-federated resource 216, responsive to receiving the third set of authentication credentials 214.

The client machine 102 receives (step 310) a first set of authentication credentials 206 from a user in a first domain of a federation. In some embodiments, the client machine 102 generates the first set of authentication credentials 206 from user-supplied data. In one of these embodiments, the client machine 102 generates an ADFS claim based on the data provided by the user. In another of these embodiments, the client machine 102 transmits user-supplied authentication to an intermediate machine, which generates the first set of authentication credentials 206.

In one embodiment, the first set of authentication credentials 206 may include authentication credentials such as a user id-password pair, a smart card certificate, a smart card personal identification number (PIN), a Kerberos authentication credential, time based tokens, digital certificates based on symmetric and elliptic key cryptography, a biometric authentication mechanism and a Data Protection Application Programming Interface (DPAPI). In another embodiment, the biometric authentication mechanism can be selected from a group consisting of fingerprint identification, iris identification, face recognition, retinal scan, voice recognition, facial thermograph, handwriting recognition, keystroke recognition, and DNA identification.

In some embodiments, the client machine 102 may directly transmit the authentication credentials received from the user as the first authentication credentials 206. In other embodiments, the client 102 may generate the first set of authentication credentials from the user supplied data. In one of these embodiments, the client credentials are not transmitted, only the resulting user authentication data is transmitted via the network 104 connecting the client 102 and the intermediate machine 105.

The intermediate machine 105, functioning as a federated identity server, authenticates (step 320) the user into the federated environment 201, responsive to receiving the first set of authentication credentials 206. In some embodiments, the intermediate machine 105 authenticates the user by comparing the received credentials against an expected response. In other embodiments, the intermediate machine 105 includes an authentication component authenticating the user of the client machine 102 via an Integrated Authentication technique, in which the client machine 102 transmits hashed user authentication credentials to the intermediate machine 105. In still other embodiments, the intermediate machine 105 comprises an authentication component authenticating the user of the client machine 102 responsive to a received Integrated Authentication credential.

In one embodiment, the intermediate machine 105 identifies the second set of credentials 208. In other embodiments, the intermediate machine 105 also includes a security service. In one of these embodiments, an authentication module and a security service are provided as a dynamically-linked library. For example, in WINDOWS-based environments, the authentication module may be provided by the MS GINA dynamically-linked library. In another of these embodiments, the security service provides security services to modules and applications on the intermediate machine 105, such as authentication to the client machine 102 and authentication to remote servers 106 or network services. For example, the security service may obtain a Kerberos ticket in response to receipt of the first set of authentication credentials 206 and use this ticket to obtain additional Kerberos tickets to authenticate the user to remote hosts or network services, at the request of modules or applications on the client machine 102.

In one embodiment the second set of authentication credentials 208 is directly transmitted to the server 106. In another embodiment, the second set of credentials are transmitted through a network of additional computing devices to the server in the second domain In further embodiments, the intermediate machine 105 impersonates the client machine 102 and requests authentication to the server 106 on behalf of the user of the client machine.

The server 106 authenticates (step 330) the user, responsive to receiving the second set of authentication credentials 208. In one embodiment, the server 106 authenticates the user responsive to retrieving, from a second server 106" identified by the intermediate machine 105, the second set of authentication credentials 208. In yet another embodiment, the server 106 authenticates the user by retrieving the second set of authentication credentials from a second server 106" identified by a second intermediate machine 105'.

The password manager retrieves (Step 340) the third set of authentication credentials 214 associated with the user. In one embodiment, the password manager program 210 retrieves the third set of authentication credentials 214 from the centralized credential store 212. In some embodiments, the password manager program 210 uses the second set of authentication credentials 208 to decrypt the third set of authentication credentials 214 associated with the user. In other embodiments, the password manager 210 provides the functionality described above in connection with FIGS. 2A and 2B. In still other embodiments, the password manager program 210 transmits the third set of authentication credentials to the non-federated resource over a network 104.

The non-federated resource 216 authenticates (step 350) the user, responsive to receiving the third set of authentication credentials. In some embodiments the non-federated resource 216 executing on the server 106' receives the third set of authentication credentials 214 and generates a launch ticket. The server 106' transmits the launch ticket to the intermediate machine 105. In one embodiment, the server 106' transmits the launch ticket to the server 106. In another embodiment, the server 106 transmits the launch ticket to the intermediate machine 105. In still another embodiment, the intermediate machine transmits the launch ticket to the client machine 102.

The client machine 102 provides, to the server 106', the launch ticket to access the non-federated resource 216. In one embodiment, the client machine provides the launch ticket directly to the server 106' with a request for access to the resource. In another embodiment, the client machine 102 uses a presentation layer protocol to communicate with the server 106'. In still another embodiment, the client machine receives, from the server 106', output data generated by an execution of the non-federated resource 216.

The systems and methods described above may be provided as one or more computer-readable programs embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, LISP, PERL, C, C++, PROLOG, or any byte code language such as JAVA. The software programs may be stored on or in one or more articles of manufacture as object code.

Having described certain embodiments of methods and systems for completing, by a single sign on component in a federated environment, an authentication process to a non-federated resource, it will now become apparent to one of skill in the art that other embodiments incorporating the concepts of the disclosure may be used. Therefore, the disclosure should not be limited to certain embodiments, but rather should be limited only by the spirit and scope of the following claims.

What is claimed is:

1. A system for facilitating distributed authentication comprising:
  a client machine, in a first domain that comprises a federated environment, receiving, from a user, a first set of authentication credentials;

an intermediate machine in a second domain that comprises the federated environment, authenticating the user responsive to receiving the first set of authentication credentials and generating a second set of authentication credentials, the second set of authentication credentials different from the first set of authentication credentials;

a first server in the second domain, authenticating the user responsive to the second set of authentication credentials generated by the intermediate machine;

a password management program comprising a single sign-on component and, executing on the first server, retrieving a third set of authentication credentials associated with the user responsive to the authentication of the user by the first server in the federated environment, retrieving a cryptographic key using the second set of authentication credentials, and decrypting the third set of authentication credentials using the cryptographic key; and a second server outside the federated environment, authenticating the user, to grant access to a resource outside the federated environment and stored on a computing device other than the client machine, responsive to receiving, from the password management program, the third set of authentication credentials.

2. The system of claim 1, wherein the federated environment comprises a set of entities having a pre-established trust relationship with each other and within which a common set of authentication credentials, known as the federated identity, is valid.

3. The system of claim 1, wherein one or more of the authentication credentials are selected from a group consisting of a user id-password pair, a smart card certificate, a smart card personal identification number (PIN), a Kerberos authentication credential, a biometric authentication mechanism and a Data Protection Application Programming Interface (DPAPI).

4. A method for facilitating distributed authentication, the method comprising the steps of:

receiving, by a client machine in a first domain in a federated environment, from a user, a first set of authentication credentials;

authenticating the user, by an intermediate machine in a second domain, responsive to receiving the first set of authentication credentials;

generating, by the intermediate machine, a second set of authentication credentials, the second set of authentication credentials different from the first set of authentication credentials;

authenticating, by a first server in the second domain of the federated environment, the user, responsive to the second set of authentication credentials generated by the intermediate machine;

retrieving, by a password management program executing on the first server, a third set of authentication credentials associated with the user, the password management program comprising a single sign-on component;

retrieving, by the password manager, a cryptographic key using the second set of authentication credentials;

decrypting, by the password manager, the third set of authentication credentials using the cryptographic key; and authenticating, by a second server outside the federated environment, the user, to grant access to a resource outside the federated environment and stored on a computing device other than the client machine, responsive to receiving, from the password management program, the third set of authentication credentials.

5. The method of claim 4, wherein the first server retrieves the second set of authentication credentials from the second server identified by the intermediate machine.

6. The method of claim 4, wherein the first server in the second domain of the federated environment, retrieves the second set of authentication credentials from the second server identified by a second intermediate machine in communication with the intermediate machine.

7. The method of claim 4, wherein one or more of the authentication credentials are selected from a group consisting of a user id-password pair, a smart card certificate, a smart card personal identification number (PIN), a Kerberos authentication credential, a biometric authentication mechanism and a Data Protection Application Programming Interface (DPAPI).

8. A system for facilitating distributed authentication comprising:

means, in a first domain in a federation, for receiving, from a user, a first set of authentication credentials;

means, in a second domain of the federation, for authenticating the user responsive to receiving the first set of authentication credentials;

means, in the second domain, for generating a second set of authentication credentials, the second set of authentication credentials different from the first set of authentication credentials;

first server means in the second domain of the federation for authenticating the user responsive to the second set of authentication credentials generated by an intermediate machine;

password management program, comprising a single sign-on component and executing on the first server, retrieving a third set of authentication credentials associated with the user, retrieving a cryptographic key using the second set of authentication credentials; and decrypting the third set of authentication credentials using the cryptographic key; and second server means, in a domain not in the federation, for authenticating the user to grant access to a resource outside the federated environment and stored on a computing device other than the client machine, responsive to receiving, from the password management program, the third set of authentication credentials.

9. The system of claim 8, wherein the means for authenticating the user responsive to receiving the first set of authentication credentials further comprises the intermediate machine in the second domain in the federation, authenticating the user responsive to receiving the first set of authentication credentials.

10. The system of claim 8, wherein the federation comprises a set of entities having a pre-established trust relationship with each other and within which a common set of authentication credentials, known as the federated identity, is valid.

11. The system of claim 8, wherein one or more of the authentication credentials are selected from a group consisting of a user id-password pair, a smart card certificate, a smart card personal identification number (PIN), a Kerberos authentication credential, a biometric authentication mechanism and a Data Protection Application Programming Interface (DPAPI).

* * * * *